United States Patent
Ingles et al.

(10) Patent No.: US 9,510,619 B2
(45) Date of Patent: Dec. 6, 2016

(54) APPARATUS FOR MOUNTING A COCONUT FOR PROCESSING

(71) Applicants: Rudland Edward Ingles, Holland Landing (CA); David R Gater, Holland Landing (CA)

(72) Inventors: Rudland Edward Ingles, Holland Landing (CA); David R Gater, Holland Landing (CA)

(*) Notice: Subject to any disclaimer, the term of this patent is extended or adjusted under 35 U.S.C. 154(b) by 114 days.

(21) Appl. No.: 14/120,523

(22) Filed: May 30, 2014

(65) Prior Publication Data
US 2015/0342246 A1 Dec. 3, 2015

(51) Int. Cl.
*A23N 5/03* (2006.01)
*A47J 43/26* (2006.01)
*A47J 43/25* (2006.01)

(52) U.S. Cl.
CPC ............. *A23N 5/03* (2013.01); *A47J 43/26* (2013.01); *A47J 43/25* (2013.01); *Y10T 83/7567* (2015.04)

(58) Field of Classification Search
CPC .............. A22C 5/00; A23N 5/03; A47J 43/26; Y10T 83/7567
USPC .......... 83/162, 451, 465, 761–762; 269/54.1, 269/54.2, 54.3, 219, 295
See application file for complete search history.

(56) References Cited

U.S. PATENT DOCUMENTS

| 1,347,899 | A | * | 7/1920 | Edington | B65D 5/5014 206/422 |
| 1,503,390 | A | * | 7/1924 | Tenney | A47J 17/16 269/21 |
| 1,514,237 | A | * | 11/1924 | Tenney | A47J 43/26 426/482 |
| 2,842,588 | A | * | 7/1958 | Honeycutt | 562/33 |
| 4,106,379 | A | * | 8/1978 | Spengler | B26F 1/40 83/171 |
| 5,950,528 | A | * | 9/1999 | Wang | A23N 7/026 99/542 |
| 5,957,045 | A | * | 9/1999 | He | A23N 7/026 99/541 |
| 2009/0139094 | A1 | * | 6/2009 | Beloin | A23N 5/03 30/120.1 |
| 2010/0124595 | A1 | * | 5/2010 | Pattenden | B26D 3/26 426/518 |

* cited by examiner

*Primary Examiner* — Stephen Choi
*Assistant Examiner* — Fernando Ayala
(74) *Attorney, Agent, or Firm* — David W. Wong

(57) ABSTRACT

The apparatus is for mounting a coconut firmly for making an initiating saw cut in the middle circumference of its shell in a direction transverse to the grain of the shell such that the coconut can be split into two desired half sections easily and simply by inserting a wedge into the saw cut and splitting it with a twisting motion over an intended coconut water receptacle. It has a three-point mount for securing the coconut and a pivotable V shape saw guide for positioning a sawing instrument in making the initiating cut. The apparatus can also be used for mounting a split half section of the coconut securely for grating its flesh with a grater.

5 Claims, 4 Drawing Sheets

APPARATUS FOR MOUNTING A COCONUT FOR PROCESSING

BACKGROUND OF THE INVENTION

1. Field of the Invention

This invention relates to an apparatus for mounting a coconut firmly for cutting its shell so that it can be split open into two half sections in order to obtain its flesh and water either for direct consumption or for further processing. The apparatus may also be used for mounting a split half section of the coconut securely for grating its flesh.

2. Background Art

Commonly, the shell of a coconut is split open into two half sections in order to have access of its flesh and water. In vast majority of domestic households coconuts are split open by using hand tools such as machetes, heavy cleavers or knives, or small axes. In the operation, the coconut with the outside husk removed is held with one hand in a sideway position, and a spot in a selected circumference of its round shell is struck heavily with a hand tool while the hand holding the coconut rotates it so that the hand tool strikes around the selected circumference until the shell splits open preferably into two half sections. Often times, the coconut does not split into two even half sections at an intended position. The operation is also rather hazardous since the user can be easily injured in such operation either by the direct hitting of the hand tool accidentally to the hand holding the coconut or by the rebound of the hand tool hitting other body parts of the user, and moreover it is very difficult to carry out as the user must exercise extreme concentration and utmost eye and hand co-ordination on hitting the selected circumference of the shell repeatedly with heavy force. Also, the coconut shell might split open at an unpredictable moment such that the delicious water within the coconut can spill out suddenly in an uncontrollable manner so that it cannot be collected and saved with a pre-arranged receptacle.

Some known devices have been made for mounting and cutting or breaking a coconut shell; however, they are complex in structure and difficult to operate or rather fragile in structure, and they also may not be used for mounting the split half section of the coconut for grating its flesh for use or for consumption.

SUMMARY OF THE INVENTION

It is a principal object of the present invention to provide an apparatus for mounting a coconut securely for making an initiating saw cut in its shell accurately and safely for subsequent splitting it into two half sections in a controllable manner.

It is another object of the present invention to provide an apparatus having a guide to facilitate making of an initiating saw cut in the coconut shell such that the shell can be split easily into two intended half sections in a controlled, accurate and safe manner.

It is another object of the present invention to provide an apparatus which is applicable also for mounting a split half section of a coconut securely for grating its flesh.

It is yet another object of the present invention to provide an apparatus which enables the splitting of the coconut shell with accuracy and in a controlled manner such that the coconut water within it can be collected with ease with an intended receptacle.

It is still another object of the present invention to provide an apparatus which is rugged in structure and easy to operate.

BRIEF DESCRIPTION OF THE DRAWINGS

Other objects of this invention will appear in the following description and appended claims reference being made to the accompanying drawings forming a part of the specification wherein like reference numerals designate corresponding parts in the several view. In the drawings

DETAILED DESCRIPTION OF THE PREFERRED EMBODIMENT

Figure 1:
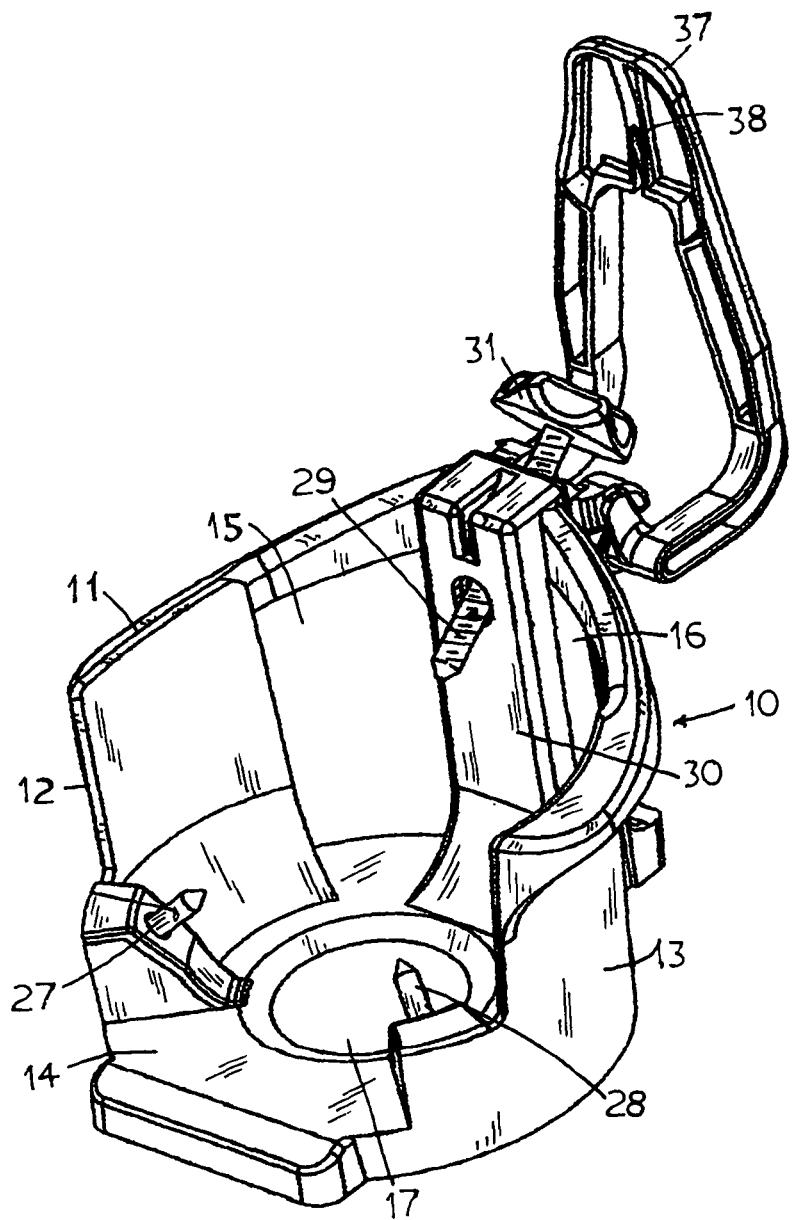
FIG. 1 is a front and side perspective view of the apparatus according to the present invention.
Figure 2:
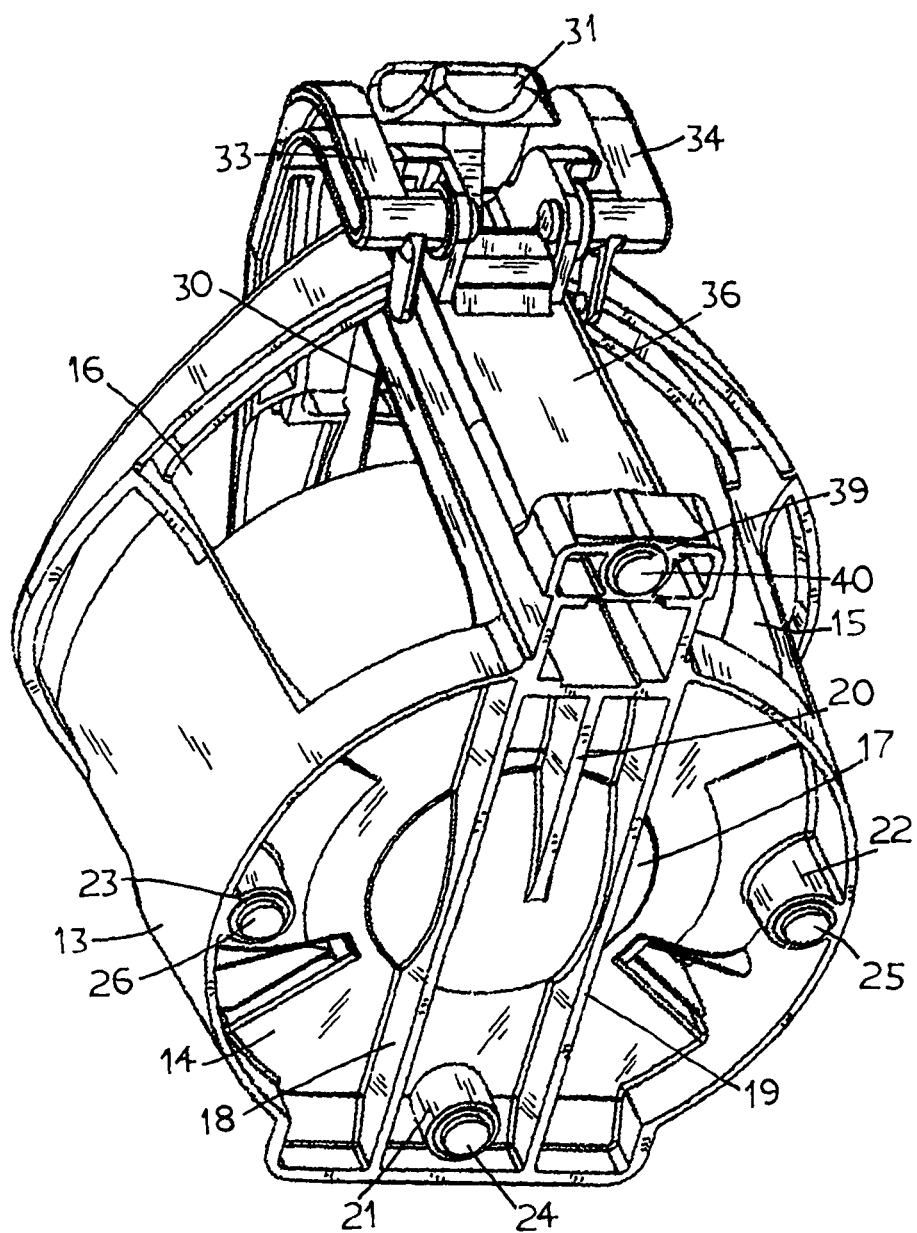
FIG. 2 is a bottom and side perspective view of the apparatus.

With reference to the drawings, the apparatus 10 according to the present invention is generally shown in FIG. 1, which is in the shape of a generally opened top round bowl-shaped housing 11 having an interior cavity and an opened front 12, and surrounding rounded enclosure side wall 13 extending upwards vertically from a bottom round base panel 14. Although a round bowl-shaped housing is shown as an exemplary embodiment, it will be apparent to one skilled in the art that the housing 11 may have other shapes such as square or rectangular shape to provide the same purposes. In order to facilitate easy cleaning, vertical side openings 15 and 16 are formed in the side wall 13 such that cleaning water of the apparatus can drain from its interior, and it can be cleaned and dried readily with ease. A central round opening 17 is formed at the center of the base 14. The central round opening 17 has a tapered edge 18 sloping downwardly and inwardly towards the center of the opening such that a coconut with its outer husk removed can lie stably in a sideway manner on the central round opening 17 in the interior cavity of housing 11. The underside of the base panel 14 is preferably recessed upward from the lower edge of the side wall 13 and transverse bars or ribs 18, 19 and 20 are located below the base panel 14 to provide additional support and reinforcement to the base panel 14.

Three evenly spaced legs 21, 22 an 23 are provided below the base 14, and non-slip inserts 24, 25 and 26 are provided at the legs 21, 22 and 23 respectively so that the apparatus 10 can be located securely on a supporting surface.

Two fixed pointed front holding pins 27, and 28 are mounted on two pedestals located on an edge portion of two opposite front edges of the open front 12 of said bowl-shaped housing 11. The fixed pointed holding pins 27 and 28 extend inwards of the housing 11 at an upward angle such that the pointed ends of the fixed holding pins 27 and 28 will engage with two spaced points of the curved front surface of the coconut resting on the bottom central opening 17 in the housing 11. An adjustable pointed rear holding pin 29 is mounted at an upper position of the rear portion 30 of the side wall 13 of the housing 11. The rear holding pin 29 is threadingly adjustable with a handle or knob 31 and it extends inwardly towards the interior of the housing 11 at a downward angle directly opposite to the two fixed holding pins 27 and 28, such that the three holding pins 27, 28 and 29 cooperate with one another to form a three-point mount for securing the coconut firmly within the housing 11.

Figure 3:
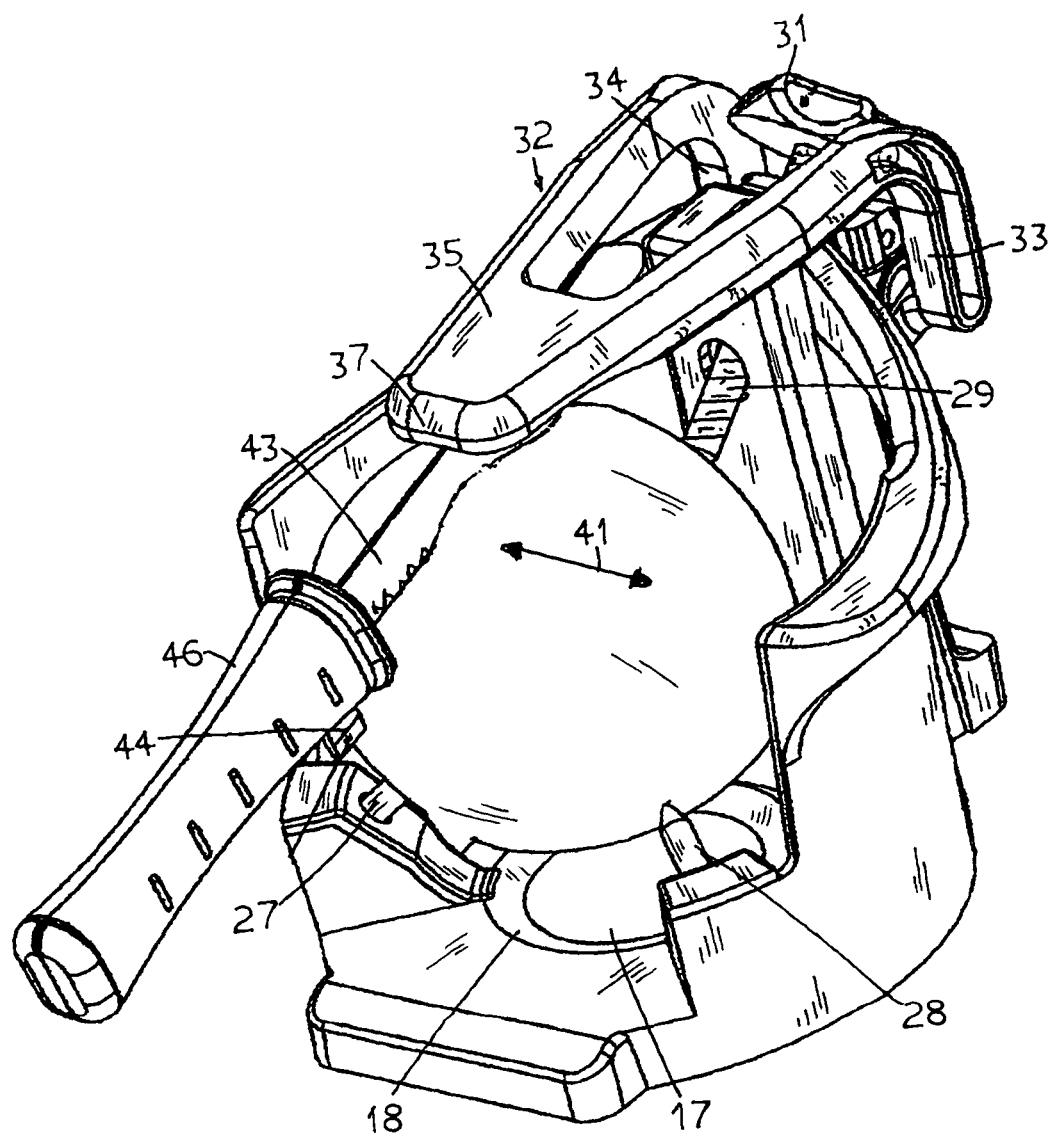
FIG. 3 is a front and side perspective view of the apparatus with a coconut mounted therein for making a score with a saw blade in preparation for splitting it into two half sections.
Figure 4:
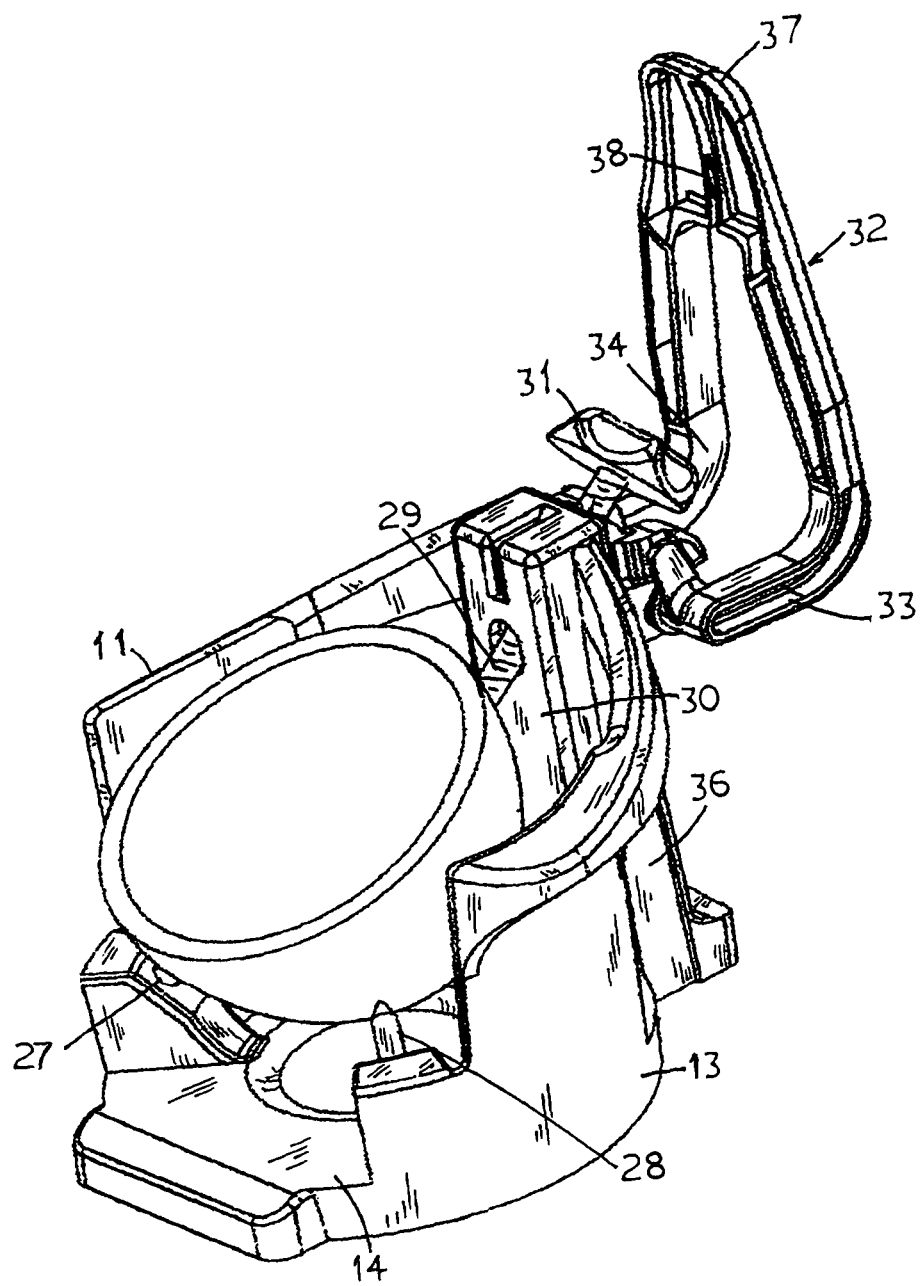
FIG. 4 is a front and side perspective view of the apparatus with a split half section of a coconut mounted therein for grating its flesh.

A saw guide 32 is provided at the top of the housing 11. The saw guide 32 is V-shaped having two bifurcated rear arms 33 and 34 formed at its rear end, and the bifurcated rear arms 33 and 34 extend at a downward right angle relative to the V-shaped main body 35 of the saw guide 32. The bifurcated rear arms 33 and 34 are pivotally mounted to the upper end of a vertical support panel 36 formed either integrally or separately located juxtaposed to the rear portion 30 of the side wall 13 of the housing 11 so that the saw guide 32 may be selectively pivotable in a vertical direction relative to said housing as best shown in FIG. 3 to locate either at a lower operating downward position with its front end 17 positioned at the middle of the interior space of the housing 11 or alternatively to an upward position with the main body of the saw guide located outside and above the housing 11 as shown in FIG. 4. The saw guide 32 may be removably mounted to the support panel 36 so that it may be conveniently removed if required. A guide slot 38 is formed at the underside of the front end 37 of the saw guide 32. The guide slot 38 extends in a direction along the longitudinal axis of the saw, and it extends transverse to the grain of the shell of the coconut when the saw guide 32 is in the downward lower operating position resting on the shell of the coconut which is placed in the cavity of the housing 11 as best shown in FIG. 3. The direction of the grain of the shell of the coconut is shown by the two-end arrow in FIG. 3.

An additional supporting leg 39 is formed at the bottom end of the support panel 36, and non-slip insert 40 is also mounted at the additional supporting leg 39 to enhance the stability of the apparatus 10 in pivoting the saw guide 32 as well as providing additional support for the apparatus 10 as a whole.

To split a coconut, the saw guide 32 is first pivoted upwards away from the interior of the housing 11, and the adjustable holding pin 29 is adjusted to the retracted position, and the coconut is placed into the housing 11 until it is disposed stably over the central round opening 17 with the grain of it shell extending in the direction transverse to the saw guide 32 as best shown by the two-end arrow 41 in FIG. 3. The adjustable holding pin 29 is then operated to urge the coconut towards the two fixed holding pins 27 and 28 until the coconut is firmly held in place by the three holding pins 27, 28 and 29 cooperating with one another. The saw guide 32 is then pivoted forward and downward with its front end now resting on the top surface of the center circumference of the shell of the coconut. A hand saw 42 with it's top edge engaging with the guide slot 38 of the saw guide 32 is operated to make an initiating cut in the shell of the coconut. A cut of about 2 to 2½ inches long is normally sufficient. The saw guide 32 is then raised and the adjustable holding pin 29 is retracted so that the coconut having the initiating cut therein can be removed from the apparatus 10 and be located over an intended coconut water receptacle. The coconut can now easily be split into two half sections by simply inserting a wedge into the cut and turning the wedge with a twisting motion. The coconut water would fall into the intended receptacle. To facilitate the splitting operation, a hand saw as shown in FIG. 3 with a wedge 44 provided on its handle may be provided for both making the initiating cut and splitting of the coconut.

As best shown in FIG. 4, a split half section of the coconut may be mounted in the apparatus 10 in the same manner with its opened side facing outward so that its flesh may be grated with a grating tool such as a hand grater, an electric operated grater, or a grating attachment mounted on an electric drill.

What is claimed is:

1. An apparatus for mounting a coconut for processing comprising:
   an opened top round bowl shape housing having an interior cavity surrounded by a round enclosure side wall and an opened front opening having opposite front edges;
   two pedestals formed adjacent to said front edges;
   two fixed pointed holding pins mounted one of each on said two pedestals, and said two fixed pointed holding pins extending at an upward angle towards the interior of said housing;
   an adjustable pointed holding pin threadingly mounted at an upper position of a rear portion of said side wall of said housing, said adjustable pointed holding pin being oriented in a downward angle and extending opposite to said two fixed pointed pins, and said adjustable pointed pin having a handle operative for regulating said adjustable pointed holding pin to cooperate with said two fixed pointed holding pins to form a three-point mount for mounting said coconut securely within said interior cavity of said housing;
   a saw guide having a V shape main body and provided with two bifurcated rear arms, and said bifurcated rear arms being pivotally mounted to an upper end of a vertical support panel located juxtaposed to said rear portion of said side wall, said saw guide being pivotable vertically relative to said housing to be located selectively in a first position in which a front end of said saw guide is located in said interior cavity of said housing, and in a second position in which said saw guide is located outside and above said housing; and
   a guide slot formed at an underside of said front end of said saw guide.

2. An apparatus according to claim 1 wherein said housing includes a base panel having an undersurface located recessed from a bottom edge of said side wall, a plurality of legs evenly positioned on said undersurface under said base panel, and a plurality of bars formed under said base panel to provide reinforcement to said base panel, and vertical openings formed in said side wall of said housing.

3. An apparatus according to claim 1 including a round central opening formed at a center portion of said base panel, said central opening having a tapering edge sloping downwardly and inwardly toward the center of said opening.

4. An apparatus according to claim 3 wherein said bifurcated arms extend at a right angle relative to said V shape main body of said saw guide.

5. An apparatus according to claim 4 wherein said saw guide is removably mounted to said vertical support panel.

* * * * *